(12) United States Patent
Olson

(10) Patent No.: US 9,225,376 B2
(45) Date of Patent: Dec. 29, 2015

(54) COMMUNICATIONS CONTROL BETWEEN MOBILE DEVICE AND PERIPHERAL DEVICE

(71) Applicant: SHORETEL, INC., Sunnyvale, CA (US)

(72) Inventor: Timothy S. Olson, San Jose, CA (US)

(73) Assignee: Shoretel, Inc., Sunnyvale, CA (US)

( * ) Notice: Subject to any disclaimer, the term of this patent is extended or adjusted under 35 U.S.C. 154(b) by 189 days.

(21) Appl. No.: 13/829,302

(22) Filed: Mar. 14, 2013

(65) Prior Publication Data

US 2014/0274200 A1   Sep. 18, 2014

(51) Int. Cl.
*H04M 1/00* (2006.01)
*H04B 1/3877* (2015.01)

(52) U.S. Cl.
CPC .................................. *H04B 1/3877* (2013.01)

(58) Field of Classification Search
CPC ............ G06F 13/4068; G06F 13/4081; G06F 3/1236; B60L 11/1838; B60R 2011/0078; H04M 1/0256; H04M 7/006; H04M 2250/02; H04M 1/2535; H04M 2250/06; H04M 1/7253; H04M 2207/18; H04M 15/8038; H04W 88/06; H04W 80/04
USPC ...................... 455/557, 41.3, 556.1
See application file for complete search history.

(56) References Cited

U.S. PATENT DOCUMENTS

| 6,023,587 | A | 2/2000 | Watts et al. |
| 8,050,714 | B2 | 11/2011 | Fadell et al. |
| 8,180,379 | B2 | 5/2012 | Forstall et al. |
| 2004/0204159 | A1 | 10/2004 | Van Bosch |
| 2005/0124380 | A1 | 6/2005 | Rokusek et al. |
| 2007/0049329 | A1 | 3/2007 | Mayer et al. |
| 2008/0195788 | A1 | 8/2008 | Tamir et al. |
| 2011/0126005 | A1* | 5/2011 | Carpenter et al. ............ 713/158 |
| 2012/0155445 | A1* | 6/2012 | Javaregowda et al. ........ 370/338 |
| 2012/0302288 | A1 | 11/2012 | Born et al. |
| 2012/0327061 | A1* | 12/2012 | Sirpal et al. ................... 345/211 |
| 2013/0028144 | A1* | 1/2013 | Goodman et al. ............ 370/259 |

FOREIGN PATENT DOCUMENTS

| EP | 0809174 B1 | 10/2002 |
| EP | 2009935 A1 | 12/2008 |
| WO | WO 01/29979 A1 | 4/2001 |

(Continued)

OTHER PUBLICATIONS

PCT International Search Report and Written Opinion 12 pgs., Jun. 30, 2014, Shoretel, Inc.

*Primary Examiner* — Tu X Nguyen

(74) *Attorney, Agent, or Firm* — Tarolli, Sundheim, Covell & Tummino LLP

(57) ABSTRACT

A non-transitory computer-readable medium can include instructions for performing a method that includes docking a mobile device with a docking station using at least one physical connection and at least one wireless connection to provide communication between the mobile device and the docking station. One of the physical or wireless connections can be selected for providing a signaling channel for communication of signaling data between the mobile device and the docking station. Independently of the signaling channel, one of the physical or wireless connections can be selected for providing a media channel for communication of media data between the mobile device and the docking station.

25 Claims, 10 Drawing Sheets

(56) References Cited

FOREIGN PATENT DOCUMENTS

| | | |
|---|---|---|
| WO | WO 01/50618 A1 | 7/2001 |
| WO | WO 2005/006713 A2 | 1/2005 |
| WO | WO 2008/079198 A1 | 7/2008 |
| WO | WO 2011/059736 A1 | 5/2011 |
| WO | WO 2011/133940 A2 | 10/2011 |

* cited by examiner

COMMUNICATIONS CONTROL BETWEEN MOBILE DEVICE AND PERIPHERAL DEVICE

TECHNICAL FIELD

This disclosure relates to a controlling communications between a mobile device and a peripheral device.

BACKGROUND

Computing devices, including portable (e.g., mobile) devices, such as cellular telephones, tablet computers, notebook computers and the like, can couple to various types of peripheral devices to expand their capabilities. One type of such peripheral is a docking station, which operates as an accessory to make a portable device operate with features and ergonomics commensurate with a more fixed version of the device. For example, as mobile telephones are being utilized more frequently for personal as well as business usage, a docking station can provide ergonomics functionality of traditional desktop telephones. There are also a variety of different functions that can be implemented by the docking station and the mobile device. Such functions can vary depending on whether the mobile device is docked or undocked with the docking station.

SUMMARY

This disclosure relates generally to controlling communications between a mobile device and a peripheral device (e.g., a docking station).

As one example, a computer-readable medium can include instructions executable by a processing resource. The instructions can include connection logic to provide connection data identifying which of at least two connections is available for communication between a mobile device and a peripheral device when the mobile device is docked with the peripheral device. A signaling manager can control a signaling channel for communication of signaling data over a first connection of the at least two connections between the mobile device and the peripheral device. The first connection can be selected from the at least two connections based on the connection data. A media manager can control a media channel for communication of media data over a second connection of the at least two connections between the mobile device and the peripheral device based on the connection data. The first connection and the second connection can be selected independently.

As another example, a non-transitory computer-readable medium can store instructions for performing a method. The method can include docking a mobile device with a docking station using at least one physical connection and at least one wireless connection to provide communication between the mobile device and the docking station. The method can also include selecting one of the physical or wireless connections for providing a signaling channel for communication of signaling data between the mobile device and the docking station. The method can also include independently of the signaling channel, selecting one of the physical or wireless connections for providing a media channel for communication of media data between the mobile device and the docking station.

As yet another example, a system can include a mobile device and peripheral device (e.g., a docking station). The mobile device can include at least one wireless interface configured to communicate with a peripheral device using a wireless communications protocol and at least one physical interface configured to communicate the peripheral device using a physical communications protocol. The mobile device can also include connection control configured to select which of the wireless and physical interfaces to utilize for communicating signaling data over a signaling channel between the mobile device and the peripheral device and media data over a media channel for over a selected connection between the mobile device and the peripheral device. The peripheral device can also include a connection controller configured to control a plurality of connections to communicate the signaling data and the media data with the mobile device over each respective connection that is selected by the connection control.

DETAILED DESCRIPTION

This disclosure relates to controlling communications between a mobile device and a peripheral device, such as a docking station. The mobile device can be configured to establish multiple connections to the peripheral device. For example, the mobile device and the peripheral can be coupled together via one or more physical communication connections, such as to provide for communication of electrical or optical signals between ports of the respective devices. Additionally or alternatively there may be one or more wireless connections for communications between the mobile device and the peripheral device. Each of these connections can be utilized for communicating media data and signaling data. Controls can select which of the connections are to be utilized for communicating each of the media data and signaling data between the mobile device and the peripheral device. Thus, a media channel for communicating media data and a signaling channel for communicating signaling data can be controlled independently, such that the media data and signaling data may be communicated via the same or different connections. The determination as to which of the connections is utilized for each of the media channel and the signaling channel can be based on one or more operating parameters, such as which connections are available, the type of access technology being utilized for implementing a media call, proximity of the media device relative to the peripheral device to which it is docked, or a combination of these or other operating parameters.

Figure 1:
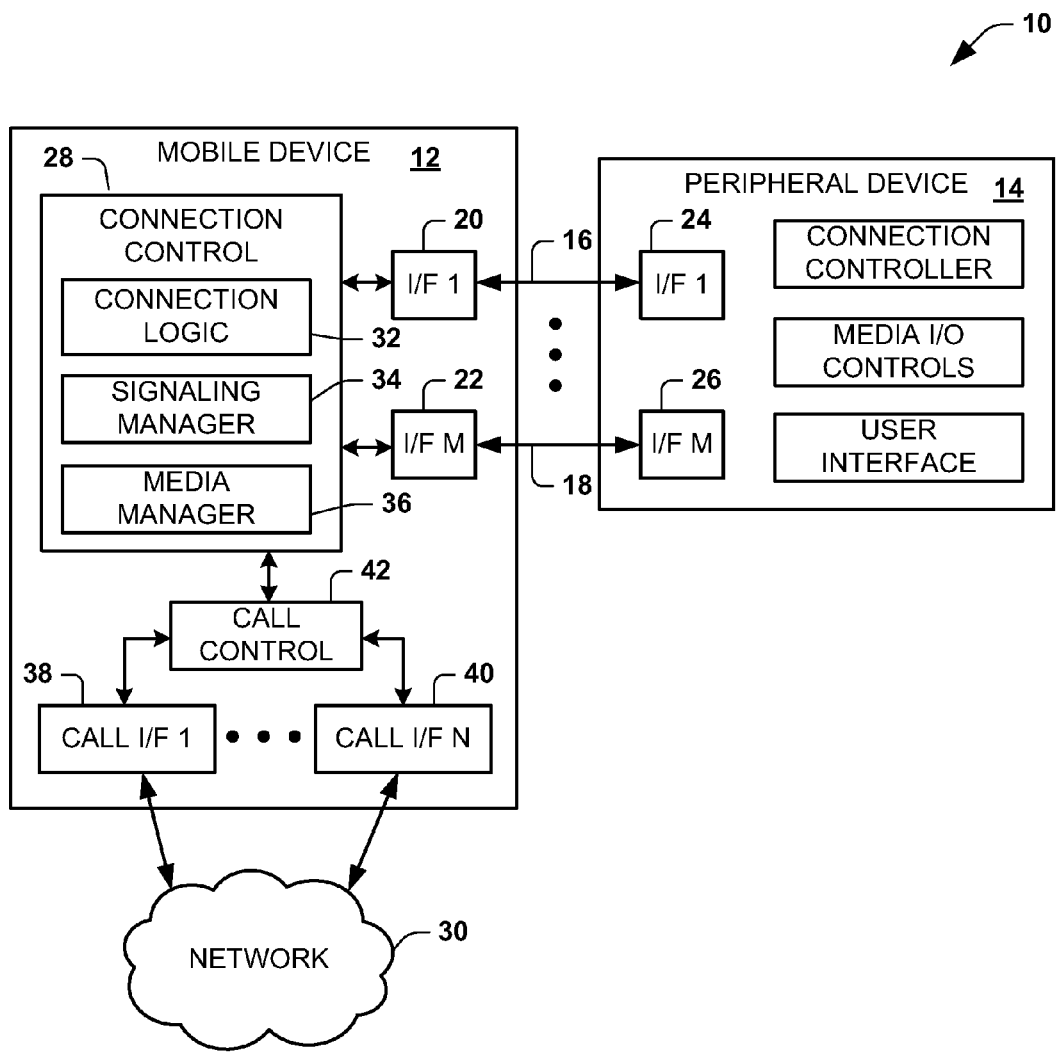
FIG. 1 depicts an example of a system of a mobile device docked with a peripheral device.

FIG. 1 depicts an example of a system 10 that includes a mobile device 12 and a peripheral device 14. The mobile device 12 can be any portable multi function device, such as a cellular telephone, smart phone, personal digital assistant (PDA), tablet computer, notebook computer or the like. The mobile device 12 can be docked with respect to the peripheral device 14 via one or more connections 16 and 18. For example, each of the connections 16 and 18 can be implemented as a physical connection, such as an electrical connection (e.g., a multi pin connection) or an optical connection (e.g., optical fiber) or a combination thereof. Additionally or alternatively, each connection 16 or 18 can be implemented as a wireless connection. Examples of wireless connections that can be implemented for docking the mobile device 12 with respect to the peripheral device 14 can include wireless communication technologies implemented according to a radio frequency (RF technology), such as one of the Bluetooth standards, wireless USB, near field communications (e.g., up to about 0.2 meters), WIFI (e.g., one of the 802.11X standards) as well as other wireless communication technologies (e.g., the use of light, such as infrared, magnetic, sound or electric fields). Thus, as used herein in the context of a mobile device and peripheral device, the term "docked" and its semantic variants refer to a communication that is established between the devices over one or more of connections 16 and 18, which can include physical connections, wireless connections or a combination of physical and wireless connections. The types of communication technologies that can be utilized to provide the one or more connections 16 and 18 will depend on the capabilities of the mobile device 12 and the peripheral device 14.

Additionally, while two such connections 16 and 18 are demonstrated in the example of FIG. 1, there can be other numbers of possible connections greater than two for docking the devices 12 and 14. In the example of FIG. 1, the mobile device includes a plurality of communication interfaces 20 and 22 indicated at I/F 1 through I/F M, where M is a positive integer greater than or equal to two denoting the number of communication technologies that can be utilized for docking with a peripheral device 14. As used herein, the term 'docked' or 'docking' or variations thereof refers to establishing an authenticated connection that can provide for communication between the mobile device and the peripheral device 14. The communication can include unidirectional or bi-directional communication of data.

For the example of a physical communication technology providing one or more of the connections 16 and 18, the physical connection can be made by direct contact between connectors (e.g., male and female parts) of the mobile device 12 and the peripheral device 14. In other examples, the physical connection 16 or 18 can be established through a cable or other connecting element that may attach to an appropriate port of one or both of the mobile device and peripheral device. Such physical connections can be in various configurations and form factors depending on the model and manufacturer of the respective devices 12 and 14.

As a further example, each interface 20 and 22 of the mobile device 12 can be communicatively coupled to a corresponding interface 24 and 26 of the peripheral device 14 via the respective connections 16 and 18. While in the example of FIG. 1, each of the mobile device 12 and the peripheral device 14 is illustrated as containing the same number of M communication interfaces, it is to be understood and appreciated that each can implement different numbers of such interfaces. In some examples, the peripheral device 14 can be implemented as including a greater number of communication interfaces 24-26 than the mobile device 12, such as to allow the peripheral device to accommodate a variety of different mobile devices (e.g., different models and/or different vendors). In other examples, the mobile device 12 may be configured to include a greater number of communication interfaces 20-22 than the peripheral device 14.

The mobile device 12 can be configured to provide for communication of media data over a media channel between the mobile device and the peripheral device 14. The mobile device 12 can also be configured to communicate signaling data over a signaling channel between the mobile device 12 and the peripheral device 14. As mentioned above, the communication can be unidirectional or bidirectional over each respective channel. The media data can include audio data, video data or a combination of audio and video data. The signaling data can include commands, instructions, or status information associated with operation of the mobile device 12 or the peripheral device 14. In some examples, the media data can be communicated as part of a media call session between the mobile device 12 and one or more third parties in communication with the mobile device 12 via a network 30.

The network 30 can include a local area network, a wide area network or a combination of local area and wide area networks, which can include one or more of wireless or physical network structures. The network 30 can be implemented according to one or more network topologies, such as can include a wide area network (WAN, e.g., such as the Internet), a local area network (e.g., LAN), a private area network (PAN) or a combination thereof. The network 30 can further include one or more physical or wireless networks, such as a cellular telephone network, a wireless local area network, a metropolitan area network or other forms of networks, each of which can employ a respective communications protocol that can vary depending on the medium.

The mobile device includes a connection control 28 to control which of the connections 16 or 18 is utilized for each of the respective signaling channel and the media channel. The connection control 28 can include connection logic 32 that can provide information (e.g., status information) about each of the connections 16 and 18. For example, the connection logic 32 can provide connection data that identifies which one or more of the connections are available to provide communications between the mobile device 12 and the peripheral device 14. The connection can be available, for example, when one or both of the connections 16 and 18 have been authenticated to enable communication such as when the mobile station is docked at the peripheral device 14. The connection logic 32 can also be programmed to control how the connections 16 and 18 are established based on operating parameters of one of both of the devices 12 and 14.

As an example, the connection logic 32 can be programmed to prevent enabling one of the connections 16 from being established unless another of the connections 18 has already been established. For example, the connection logic may be programmed to prevent a wireless connection (e.g., Bluetooth or other short range communication technology) from being authenticated to enable communication between a mobile device 12 and peripheral device 14 unless a physical connection (e.g., connection 18) has first been detected. In this way, the connection logic 32 may help prevent an inadvertent docking between a mobile device and the peripheral device without a user first manually docking the mobile device with the peripheral device 14. However, the connection logic 32 can be programmed to override such docking prevention in response to a user input instruction (e.g., made at the docking station) to force docking the mobile device with the docking station via a wireless connection. The particular algorithm that is utilized to control on which connection each of the media channel and signaling channel is communicated can vary depending upon the types of communication technologies utilized by each of the interfaces 20 and 22, for example. Additionally or alternatively the connection 16 through 18 that is utilized for communicating each of the media and signaling channels can depend on the type of communication access technology via which the media is communicated to and from the mobile device 12. The connection control 28 thus can dynamically switch the media channel and/or the signaling channel between respective connections based on these or other parameters.

As a further example, the connection control 28 can include a signaling manager 34 and a media manager 36 each of which independently can control which connection 16 through 18 are used to provide the respective signaling channel and media channel for communication between the mobile device 12 and the peripheral device 14. The signaling manager 34 can be programmed to control the signaling channel for communication of signaling data over one of the connections 16 or 18 that has been authenticated for communication between the mobile device and the peripheral device. The decision can be based on the connection data provided by the connection logic 32. Similarly, the media manager 36 can be programmed to control the media channel for communication of media data over a selected one of the connections 16 or 18 between the mobile device 12 and the peripheral device 14 based on the connection data. The independent control of the media channel and the signaling channel can afford the system 10 improved audio quality and flexibility according to the types of connections that may be established. Such flexibility becomes relevant as one or more of the connections 16 through 18 may be enabled and disabled such as in response to attaching or removing the mobile device relative to the peripheral device 14.

As mentioned above, the media channel can include media data that is received at the mobile device 12 via the network 30 associated with a media session. To implement the media session, the mobile device 12 can include one or more media interface 38 and 40 demonstrated as Media IF/1 through Media IF/N, where N is a positive integer denoting the number of access technologies that can be utilized for communication of media via the network 30. In some examples, each of the media interfaces 38 and 40 can be implemented as wireless access technologies configured to communicate electromagnetic signals that can use any of a number of communication standards, protocols and technologies such as including global system for mobile (GSM), code division multiple access (CDMA), time division multiple access (TDMA), wideband-CDMA (W-CDMA), WIFI (e.g., one of the IEEE 802.11X standards), wireless metropolitan area networks (WirelessMAN), such as WiMax, satellite radio, two-way (or half-duplex) radio and the like. Additionally or alternatively, the mobile device 12 can employ other wireless data protocols (e.g., General Packet Radio Service (GPRS), Enhanced Data rates for GSM Evolution (EDGE), Universal Mobile Telecommunications System (UMTS)) that permit concurrent voice and data over the same network, which such data can be utilized for conducting a VOIP call session. Those skilled in the art will understand and appreciate that various standards and protocols exist and have yet to be developed to enable communication via these and other radio technologies.

The mobile device 12 can also include a call control module 42 that can selectively control which of the media interfaces 38 and 40 is utilized for conducting the media session. The call control 42 can also handle call set up and termination via one or more of the access technologies. In some examples, the call control 42 can switch or handover an ongoing media session from one access technology to another access technology. Examples of mechanisms that can be implemented by the call control 42 for controlling handover between different access technologies are disclosed in U.S. Pat. No. 8,140,079, entitled SYSTEM AND METHOD TO FACILITATE HANDOVER, which is incorporated herein by reference. Other approaches for implementing handover between access technologies can be utilized by the call control 42 including known approaches as well as those that may be subsequently developed.

In some examples, the call control 42 can provide information to the connection control 28 with media interface data identifying which of the access technologies and interfaces 38 and 40 is utilized for communicating the media data relative to the network 30. The call control 42 can also provide media interface data to indicate if a handover is being implemented between the different access technologies implemented by the respective interfaces 38 and 40. For example, the connection control 28, including the media manager 36 and/or the signaling manager 34, can utilize the media interface data, which can describe media session parameters, to dynamically control and modify which of the connections 16 and 18 is utilized for the respective signaling channel and the media channel.

It is to be understood that the various blocks and functions disclosed in the mobile device 12 and the peripheral device 14 in the example system 10 can be implemented as software (e.g., stored on a non-transitory medium or media), hardware (e.g., a processor or controller executing instructions), or as a combination of software and hardware.

Figure 2:
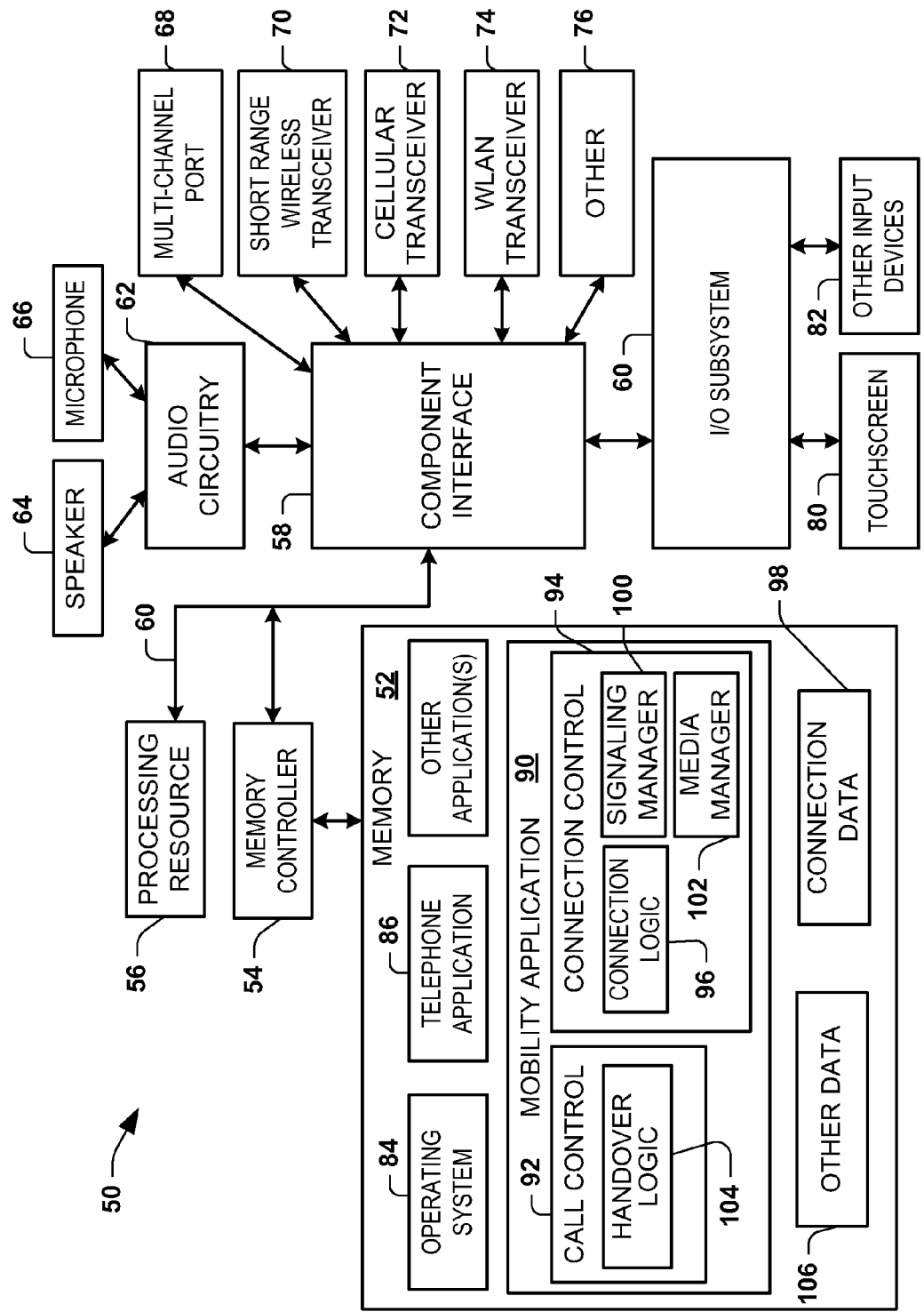
FIG. 2 depicts an example of a mobile device that can be implemented for docking with a peripheral device.

FIG. 2 depicts an example of a mobile device 50. The mobile device 50 can be configured to connect with a peripheral device, such as a docking station (e.g., the peripheral device 14 of FIG. 1). The mobile device 50 can include memory 52, which may include one or more non-transitory computer readable storage media, a memory controller 54 and a processing resource 56. The processing resource 56 can be implemented as including one or more processor cores. The memory controller 54 and processing resource 56 can be coupled to a component interface 58 via an internal bus 60. There can be any number of one or more buses implemented within the mobile device to enable communication between the respective components implemented in the mobile device 50.

The mobile device 50 also includes audio circuitry 62 coupled to the interface 58. One or more speakers 64 and one or more microphones 66 can be coupled to the audio circuitry to provide an audio interface between the mobile device 50 and the user. The speaker 64 can convert electrical signals from the audio circuitry 62 into audible sound. The microphone 66 can convert audible (e.g., voice) signals to an electrical signal that is provided to the audio circuitry 62. The respective audio signals communicated to and from the audio circuitry 62 can further be communicated to the component interface 58 and distributed to other components via the internal communication bus structure.

The mobile device 50 can also include a multi-channel I/O port 68, a short range wireless transceiver 70, a cellular transceiver 72, a WLAN transceiver 74 as well as other forms of communication devices and/or sensors demonstrated schematically as "other" 76. Each of the respective ports and transceivers 68, 70, 72, 74, and 76 can be communicatively coupled with the component interface 58. An I/O subsystem 78 can also be coupled to the component interface 58 for connecting to other input/output components, such as including a touch screen 80 as well as one or more other input devices 82 (e.g., keys, buttons or other user input mechanisms). The I/O subsystem 78, for example, can include controllers for controlling communication of I/O components 80 and 82.

The memory 52 can include volatile memory (e.g., random access memory) as well as non-volatile memory (e.g., magnetic disc storage, flash memory, solid state memory or the like). The memory controller 54 can control access to the memory by the processing resource 56 and the other components in the system that are coupled to the component interface 58. The memory 52 can also include an operating system 84, a telephone application 86 as well as one or more other applications 88, which may be resident in the memory for performing the basic functions of the mobile device 50. For example, the operating system 84 can be programmed to communicate with an authenticated remote device (e.g., a docking station) automatically using a prescribed protocol (e.g., Bluetooth) via the transceiver 70. Some applications further may be installed by a user such as downloaded from a remote location (e.g., a server or another computer).

The memory 52 can also include a mobility application 90 that is programmed to provide or extend a unified communications. For example, the mobility application 90 can employ the existing telephone application 86 in conjunction with one or more of the device components, such as the cellular transceiver 72, the WLAN transceiver 74 or the communication mechanisms 76, for making, receiving and conducting calls across one or more networks. For example the mobility application 90 can employ least cost routing rules and quality of service to control which access technology to utilize for a given call. In this context, the call can include any form of media including audio, video or a combination of audio and video.

The mobility application 90 can include call control 92 as well as connection control 94. The connection control 94 can include connection logic 96 to control and authenticate connections between the mobile device 50 and a peripheral device (e.g., a docking station) as disclosed herein. The connection logic 96 can also provide connection data 98, which can be stored in the memory 52 for identifying which connection or set of connections is available for communication between a mobile device and a docking station. The connection data thus can identify when a mobile device is docked with a docking station as well as identify the particular connections and mobile device components operative to provide communication over each respective connection. Since the types of connection between the mobile device 50 and a docking station can change dynamically over time, such as in response to physically attaching and removing the mobile device from one or more connections, the connection logic 96 can maintain the state of such connections as part of the connection data 98. In some examples, the connection data and the connection state information can be maintained as part of a state machine.

A signaling manager 100 can employ the connection data 98 to control which of the available connections will provide the signaling channel for communication of signaling data between the mobile device 50 and a docking station to which the device has been docked. The connection control 94 also includes a media manager that is programmed to utilize the connection data for controlling a media channel for communication of media data over a selected one of the available connections between the mobile device 50 and a docking station to which it has been docked. Each of the signaling manager 100 and the media manager 102 independently controls its respective channel and thus can employ different methodologies and algorithms to determine which connection to utilize for communication of the respective channels. Because the connection controls 94 decouples the signaling channel from the media channel a more robust and adaptive docking session can be realized.

By way of further example, the call control 92 can include handover logic 104 to control changes between different access technologies. For example, the handover logic 104 can implement an approach to utilize least cost routing for a media call be selectively making or receiving a call over one wireless access technology and transfer the call to another wireless access technology depending on the rules implemented by the handover logic. In some examples, the handover logic 104 can control implementing the calls through the cellular transceiver 72 and the WLAN transceiver 74 such as for conducting a VOIP call. A VOIP call can be implemented over any VOIP access technology, which can include VOIP over cellular data, VOIP over a WLAN or VOIP over any other access technology configured to support VOIP using physical or wireless networks. The available communication with the docking station can be via the multi-channel I/O port 68, the short range wireless transceiver 70 as well as one or more other connections that might exist between the mobile device and the docking station.

In some examples, the connection logic 96 can be programmed to disable establishing a connection using one of the I/O port 68 or transceiver 70 until another one of the connections has been authenticated and established between the mobile device and the docking station. For instance, the connection logic 96 can selectively enable a wireless connection via the short range wireless transceiver 70 based on control information that is stored in the connection data 98 indicating that an authenticated physical connection (e.g., via I/O port 68) already exists. The control information can be derived from determining the authenticated connection has been established via the multi-channel I/O port 68 and a corresponding port of a docking station, which can be stored as part of the connection data 98. In some examples, the signaling manager 100 can give priority to the physical connection via the multi-channel I/O port 68 over the corresponding wireless connection via the wireless transceiver 70 with the docking station. However in the absence of the physical connection being established, the mobile device 50 can utilize the wireless transceiver 70 for the signaling channel. Additionally, if the mobile device is no longer docked with the docking station the media channel with route through the audio resources of the mobile device namely the speaker 64 and the microphone 66. This can be implemented in the hands free speakerphone mode or in a conventional handset mode for the mobile device.

In some examples, the media manager 102 can selectively control which of the multi-channel I/O port 68 or via the short range wireless transceiver 70 is utilized for communication of the media channel based on the access technologies that is specified by the call control 92. As mentioned above, other data 106 can include media interface data specifying which access technology and/or respective transceiver 72, 74, 76 is utilized for communicating media data over a network.

As an example, the media manager 102 can be programmed to communicate the media channel over a physical channel (the multi-channel I/O port 68) based on the connection data 98 indicating that the mobile device 50 is docked with the docking station and in response to the media interface data specified in the other data 106 indicating a handover from a cellular access technology (e.g., via the cellular transceiver 72) to a VOIP access technology (e.g., via the WLAN transceiver 74). That is, the media manager 102 can utilize the physical connection (e.g., via the multi-channel I/O port 68) with the docking station for VOIP calls which can be wireless VOIP or VOIP over a physical network.

As another example, if the handover logic 104 has triggered a handover from the VOIP access technology to cellular, which handover condition can be stored as part of the other data 106, the media manager 102 can control the components 70 and 76 to provide for communicating the media channel via the wireless transceiver 70 and not the physical connection via the multi-channel I/O port 68. If the connection logic 96 determines that wireless connection between the wireless transceiver 70 and the docking station is lost, the media manager 102 can switch the media channel from the wireless connection back to the multi-channel I/O port provided it also still exists. If the connection logic 96 determines that the mobile device 50 is no longer docked with the docking station, the media manager 102 can route the media data with respect to audio circuitry of the mobile device.

In some examples, the handover logic 104 can control the handover between VOIP and cellular access technologies based on the connection data 98 indicating whether or not the mobile device 50 is docked with the docking station. For instance, the handover logic 104 of the call control 92 can prioritize VOIP media connection when the connection data 98 indicates that the mobile device is docked. As an example, the handover logic 104 of the call control 92 can implement call quality metrics (e.g., based on one or more of received signal strength, transmit power, bit error rate, packet error rate) and implement handover based on the metric indicating call quality below a prescribed threshold. In response to connection data indicating that the mobile device 50 is docked, the call control can adjust the threshold to make handover more difficult, thereby prioritizing VOIP media sessions when docked. In some examples, the handover logic can disable handing over a VOIP call to a cellular call, unless the VOIP connection is dropped. Other call metrics can be utilized to prioritize VOIP media while the mobile device is docked.

As a further example, whichever of the connections is utilized for signaling, as controlled by the signaling manager 100, the connection control 96 can include a data extractor that can receive an encapsulated message that is provided via the signaling channel. For example, in response to user inputs received at a user input device (e.g., a keypad) at a docking station, the docketing station can communicate such inputs encoded in the signaling channel. The connections control 94 can receive the encoded input data and the data extractor 108 can extract the encoded data to provide corresponding instructions for controlling the mobile device 50 based on the inputs at the docking station. For instance, the user input can be used to control the telephone application such as for dialing or implementing other key commands on the mobile device 50.

By way of further example, the call control 92 can be responsive to the data encoded in the user input message that is encapsulated in the signaling channel for implementing a VOIP access technology media session, such as via the WLAN transceiver 74. For instance, the call control 92 can utilize the user input information, such as corresponding to a button down and button up duration, and convert encoded button up and button down data to provide instructions for implementing the VOIP call via the WLAN transceiver. The data encoded in the user input message can include data specifying a source of the information (e.g., which of a plurality of different buttons) as well as a time when the user input device (e.g., button) was activated and a time when it was deactivated. The call control can employ such data to determine which button and a duration of when the button was down that can be utilized for making the VOIP call. For instance, the call control can provide signaling data back to docking station via the signaling channel to provide a dual tone multi-frequency (DTMF) tones according to the button pressed and the duration that the button is pressed. In the example where a wireless connection is utilized for the signaling channel, the user inputs can be encoded according to a wireless protocol, such as the Bluetooth Network Encapsulation Protocol (BNEP), for transferring application level data via the signaling path between the mobility application 90 and the docking station. For example, BNEP or other encapsulation protocol can be used to send user input messages from the docking station to the mobile device, such as for dialing or other related call controls. Additionally, BNEP or other encapsulation protocol can be used to send update messages (e.g., firmware updates and the like) from the mobile device 50 to the docking station.

Figure 3:
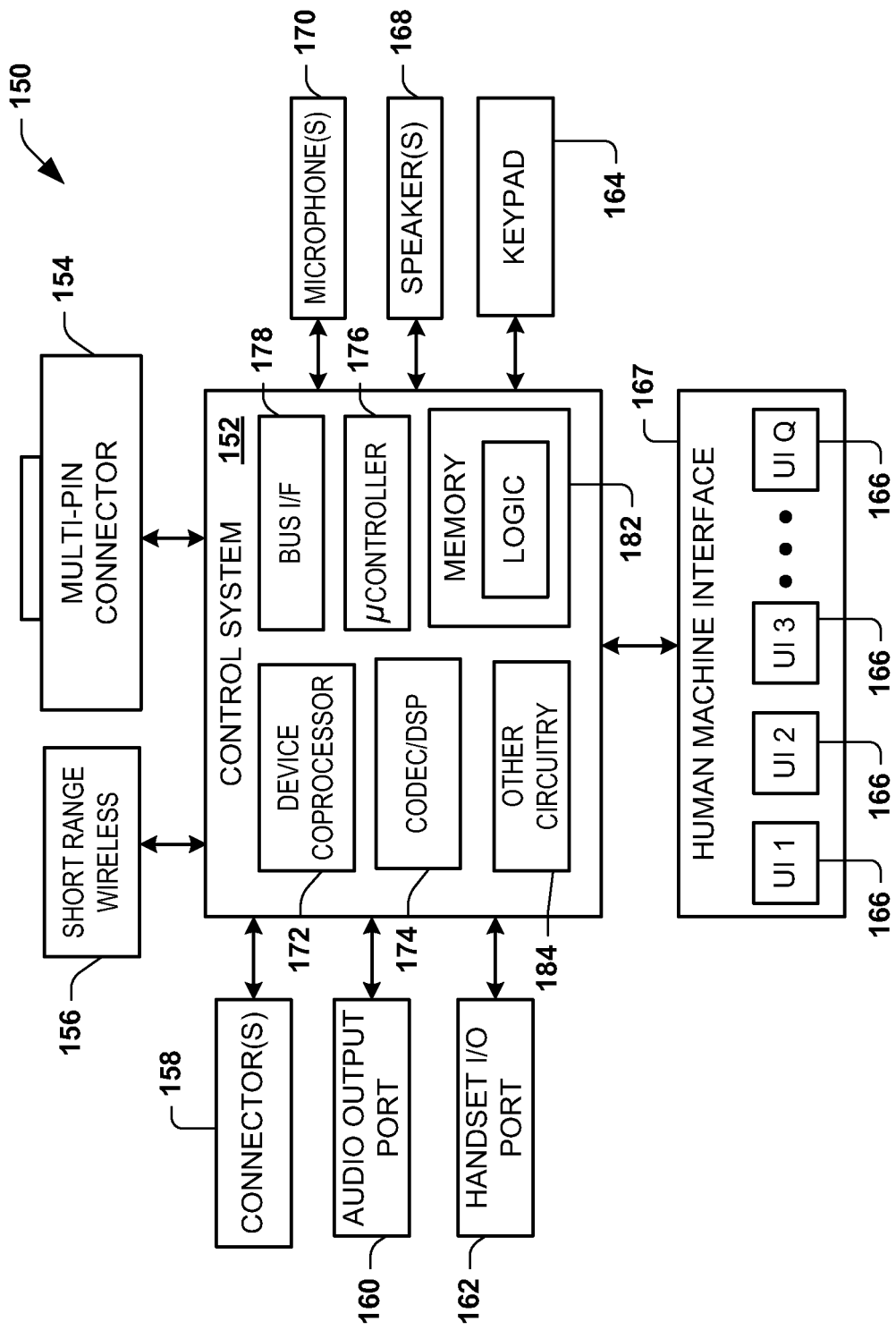
FIG. 3 depicts an example of a peripheral device.

FIG. 3 depicts an example of a peripheral corresponding to a docking station 150 that can be connected with a mobile device (e.g., mobile device 50 of FIG. 2 or mobile device 12 of FIG. 1). The docking station 150 can include connectors and electronics to provide functionality commensurate with a desk phone such as including a keypad for dialing, a speaker for conducting handsfree calls, and a handset that can be utilized for speaking and listening in private. While the example of FIG. 3 demonstrates a phone for audio communication, it is to be understood and appreciated that additional functionality for video conferencing and calls can be utilized and further may leverage audio and video capabilities of a mobile device that may be attached to the docking station 150. In other examples, communications technology can be distributed between the docking station 150 and a mobile device that can docked with the docking station via one or more connections.

The docking station 150 includes a control system 152 that is configured to provide for audio processing and for docking a mobile device through one or more connections, which can include a multi-pin connector 154 and a short range wireless connector 156. As an example, the short range wireless connector 156 can be implemented by a Bluetooth module. In addition to the multi-pin connector 154 one or more other physical connectors 158 can be provided for connecting to the mobile device or other devices. Such connectors 158 can be implemented, for example, as USB, fire wire or the like.

As an example, the multi-pin connector 154 can provide an external port that is the same and/or similar to and/or compatible with a thirty-pin connector used for various devices commercially available from Apple Computer, Inc. Other types of multi-pin connectors can also be utilized with form factors depending on the configuration and capabilities of the mobile device that is to be docked with the docking station 150. The docking station 150 can also include additional ports, including an audio output port 160 and a handset I/O port 162. The audio output port 160 can be utilized to plug in an external speaker or headset, for example. The handset I/O port 162 can be utilized for providing an audio connection with a handset, such as through an RJ22 jack.

The station 150 can also include a keypad 164 as well as other user input devices 166 that provide a human machine interface 167 for interfacing with the functions provided by the station 150. The keypad 164 can be numerical, alphanumerical or various other types of keypads. The user input devices 166 can include various buttons to access predetermined functionality of the station 150, such as including a power button (e.g., UI1) to turn on and off the station, as well as for implanting other control functions. Such other control functions can include a button (e.g., UI3) for selectively activating the short range wireless module 156. Another of the user input devices 166 (e.g., UIQ) can be implemented as a volume control for adjusting the volume that can be provided via the audio output port 160, a speaker 168 or the handset I/O port 162. Other user input devices 166 (e.g., UI1) can be utilized to selectively activate and deactivate the speakerphone functionality, which employs one or more speakers 168 for providing audio output and one or more microphones 170 for receiving audio input from a user. Another user input device 166 (e.g., UI2) can be utilize to selective activate and deactivate the handset I/O port 162 for enabling audio input and output to be provided via the handset I/O port 162.

The control system 152 is configured to control various functionality of the station including connections that can be made with a mobile device such as via the short range wireless module 156, the multi-pin connector 154 or one or more other connectors 158. In the example of FIG. 3, the control system 152 includes a device coprocessor 172, a codec/DSP 174, a micro controller 176, a bus interface 178, and memory 180. The memory 180 can include logic that can store rules for controlling the functionality of the station 150 and the use of its various components in response to user inputs, such as can be made via the human machine interface 167 and/or the keypad 164. Additionally or alternatively, the logic 182 can control various components of the station 150 in response to instructions or commands received via a signaling channel over a connection using one or more of the connectors 154, 156 and/or 158.

In addition to communicating media data and signaling data via connections specified by a mobile device, the control system 152 can be configured to provide charging power to a mobile device that is connected via the multi-pin connector 154 or the connector 158. For example, the other circuitry 184 can include a power source configured to supply a predetermined charging voltage to the mobile device via one or more of the pins of the multi-pin connector 154 or the other connectors 158. In this way, the mobile device that is physically connected via one of the connectors 154 or 158 can continually charge while utilizing its processing resource and communication technologies for transmission of media data between the docking station 150 and a network such as disclosed herein.

FIGS. 4 through 10 illustrate examples of some signaling that can be implemented between the mobile device and a peripheral device (e.g., docking station) for performing the various functions disclosed herein. For sake of consistency, the same reference numbers refer to the same parts in the various examples of FIGS. 4-10. In these examples, physical actions or operations performed by a user 202 are demonstrated by arrows originating from a user block and being performed with respect to a mobile device 204 or a peripheral device 206, such as the docking station or other accessory. Lines having arrows on both sides are utilized to indicate signaling between multiple devices or bi-directional interaction, whereas a line with a single arrow indicates that communication from one device or user to another.

Figure 4:
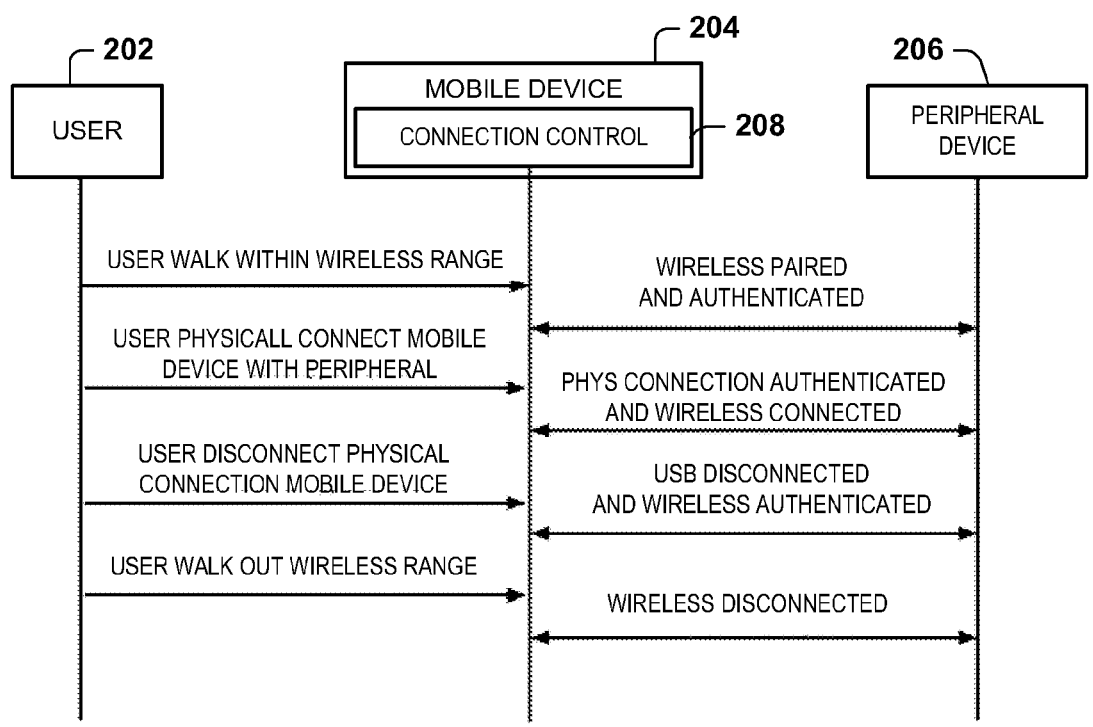
FIG. 4 depicts is a signaling diagram demonstrating an example of establishing a connection between the mobile device and a peripheral device.

FIG. 4 provides an example of signaling for authentication between a mobile device 204 and a peripheral device 206 over both a physical and wireless interface, such as Bluetooth. As a user 202 brings the mobile device 204 with a range of a short range wireless connection with a peripheral device 206 to which it has already been authorized (e.g., in response to a user configuration process), the peripheral device and mobile device can be paired and authenticated automatically to enable communication of media and signaling data. A user action can be performed to physically dock the mobile device with the peripheral device, such as by creating a physical electrical connection between the mobile device and peripheral device. Such physical connection enables further authentication over the physical connection, such as a universal serial bus. At this stage audio, can be routed via USB or Bluetooth between the mobile device and the peripheral device. Next, a user may undock a mobile device from the peripheral device, such that the physical connection has disconnected and the wireless connection may remain authenticated. From this connection mode, media can be routed to the mobile device or the media and signaling channel can be provided via the short range wireless connection. After a user takes the mobile device out of range for it to maintain the short range wireless connection, the connection may be broken or disconnected.

Figure 5:
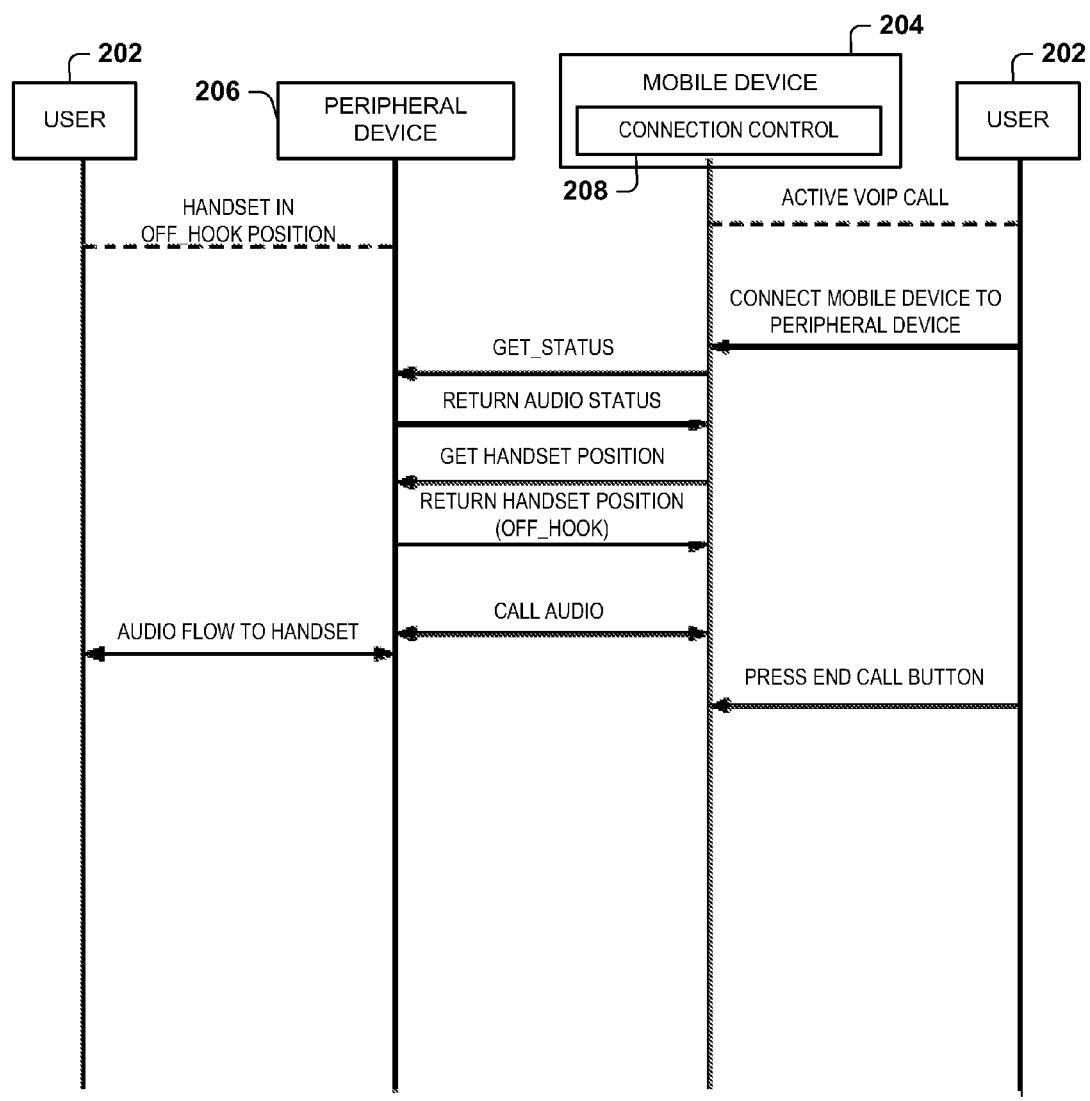
FIG. 5 is a signaling diagram demonstrating an example of signaling that can occur in response to docking a mobile device to a peripheral device during a VOIP call.

In the example of FIG. 5, the user 202 is shown as interacting with the peripheral device 206 and with the mobile device 204. In the example of FIG. 5, it is presumed that the initial state of the mobile device is an active VOIP call and that the handset of the peripheral device is in the off hook position. In response to a user docking the mobile device 204 to the peripheral device 206, the connection control of the mobile device issues a signaling request to the peripheral device via a signaling channel to obtain data specifying its operating status. The peripheral device 206 can return a status reply to the connection control 208, such as to indicate audio LEDs state. The connection control can issue another request to the handset position data of the docking station. In response, the peripheral device 206 can employ the signaling channel (over the selected connection) to return an indication of the handset position being off hook. In response to acquiring the status information for the peripheral device 206, the connection control 208 of the mobile device can communicate media data to the peripheral device via a connection (e.g., wireless or physical connection) that is selected as disclosed herein. The control logic of peripheral device can in turn flow the audio to the user via the handset of the peripheral device 206 due to its off hook position. The call can continue with the call audio being routed to the handset until the call session is terminated, such as in response to a user input via the user 202 pressing an "end call button" on the mobile device.

Figure 6:
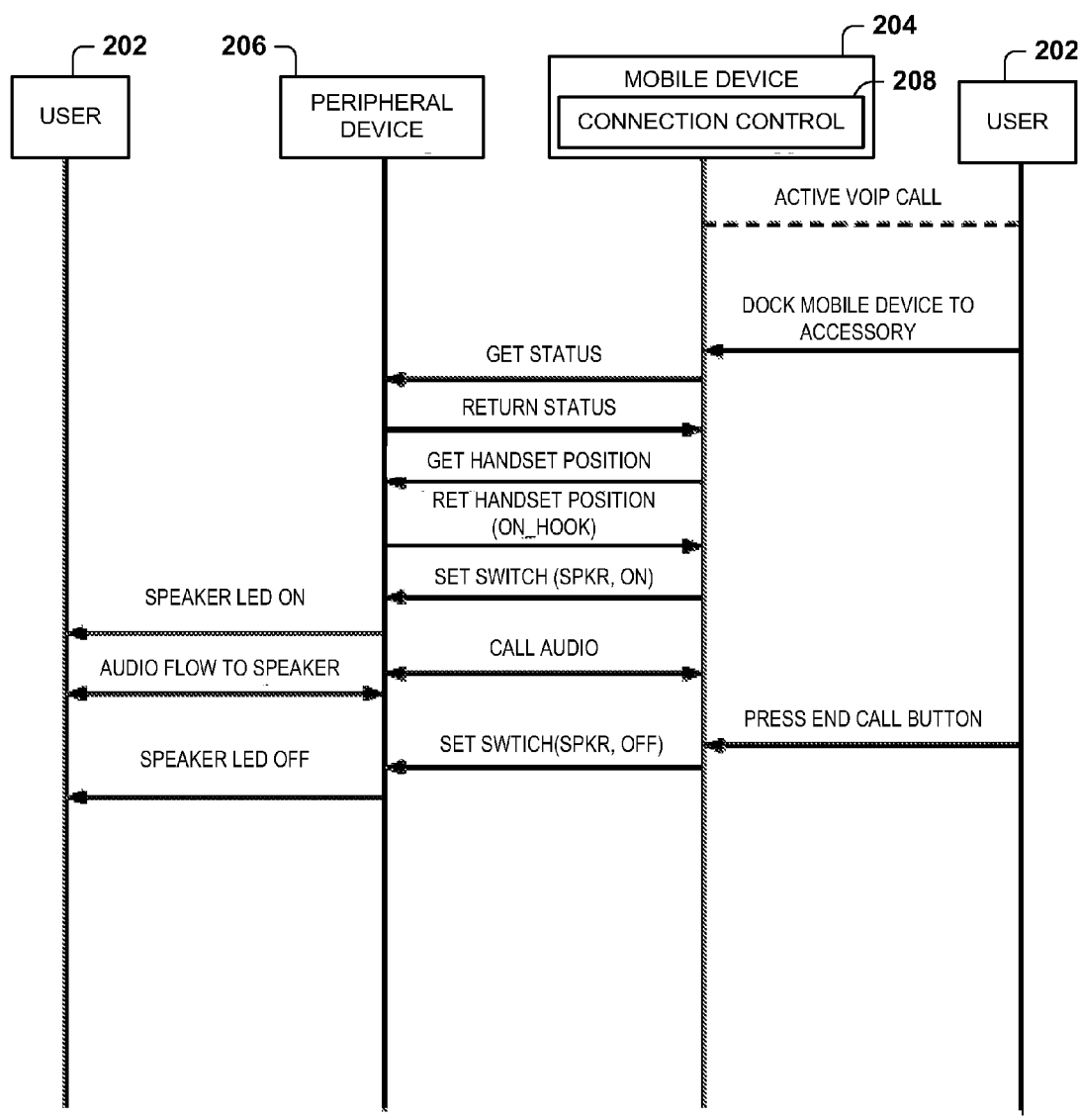
FIG. 6 is a signaling diagram demonstrating an example of signaling that can occur in response to docking a mobile device to a peripheral device during a VOIP call.

In the example of FIG. 6, it is assumed that an active VOIP call is being conducted via the mobile device 204 before being docked to the peripheral device 206. The signaling demonstrates the user connects the mobile device 204 to the peripheral device 206 thereby docking it and enabling interaction between the peripheral device and the mobile device via one or more connections. In response to being docked, the connection control 208 can issue a request for status of the peripheral device 206, such as a status that can be indicated by a state machine used to drive LEDs of the peripheral device. The peripheral device 206 can return an indication of the status of the respective components, such as via a return get LEDS response. The connection control 208 can further request a handset status via a handset position request, and the peripheral device can return the handset position, which in this example is on hook. The connection control 208 can further provide a command to the peripheral device to control audio on the peripheral device 206, which can include activating the speaker of the peripheral device to an ON condition and illuminating the corresponding LED indicator. In response to the command via the signaling channel, the peripheral device 206 can turn the speaker LED ON which can be visualized to the user via the LED. The media channel can be established over one of the available connections between the peripheral device and the mobile device as selected by the connection control 208 as disclosed herein.

For example, during an active VOIP call session, priority can be given to the physical connection (e.g., a multi-pin connection) to provide media data over the media channel between the peripheral device 206 and the mobile device 204. Resulting audio can flow to the speaker that has been activated via the signaling command to set the speaker to the ON position. Communication thus can be conducted in a hands free mode via the speaker and microphone via the peripheral device. The call can continue until the user presses an end call button which in turn results in the connection control 208 issuing a command to turn the speaker OFF. The peripheral device 206 in turn responds to the command based on its logic to turn the speaker off.

Figure 7:
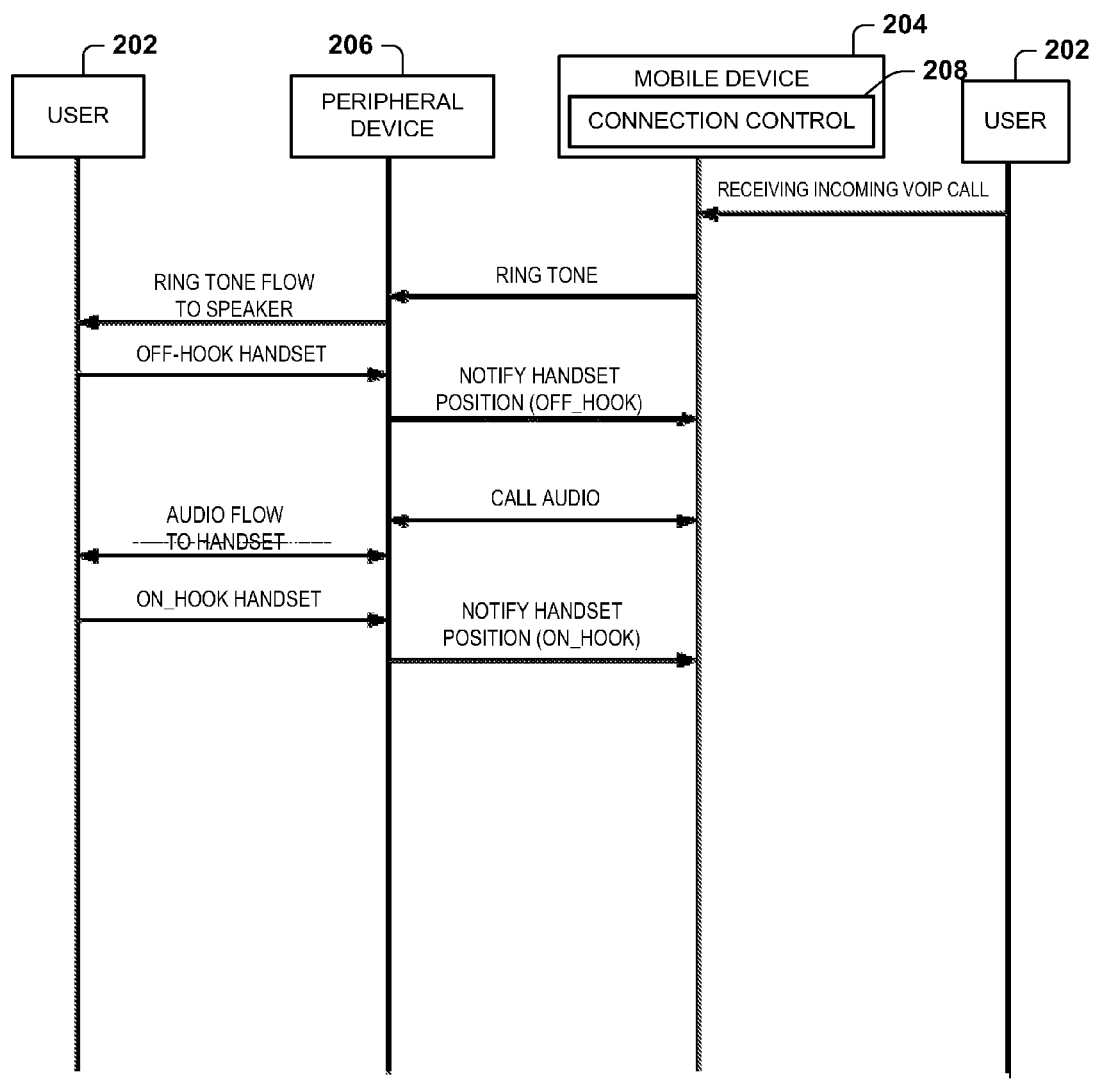
FIG. 7 is a signaling diagram demonstrating an example of signaling that occur in response to answering an incoming VOIP call at the peripheral device.

FIG. 7 demonstrates a signaling diagram for an example scenario where an incoming call is answered through a handset of the peripheral device 206. In the example of FIG. 7, an incoming VOIP call is received at the mobile device 204 (e.g., via call control utilizing a VOIP access technology). The connection control 208 employs a signaling channel over a selected connection between the peripheral device and the mobile device 204 to provide a ringtone command. The peripheral device 206 in turn provides a ring tone to flow through its speaker or other indicator mechanism (e.g., a light) to indicate an incoming call. In this example, the user 202 manually picks the handset up, which can activate a corresponding switch at the peripheral device 206. Controls in the peripheral device 206 in turn send a handset position signal via the signaling channel to the connection control 208 of the mobile device 204 to indicate that the handset has been placed in the off hook condition. The connection control 208 can establish the media channel between the peripheral device and the mobile device over a selected connection based upon the circumstances of the call. For example, being a VOIP call, the call connection control can specify a physical connection if available for the media channel between the peripheral device and the mobile device 204. The audio or other media that is provided to the peripheral device 206 can in turn be provided to the handset by the peripheral device based on control logic implemented by the peripheral. At some point in this example, in response to the handset returning to an on hook position at the peripheral device 206, the peripheral device can supply a notification of the handset position being placed on hook to the connection control 208 via the signaling channel. The on hook signaling information can be utilized by the connection control 208 to terminate the VOIP call.

Figure 8:
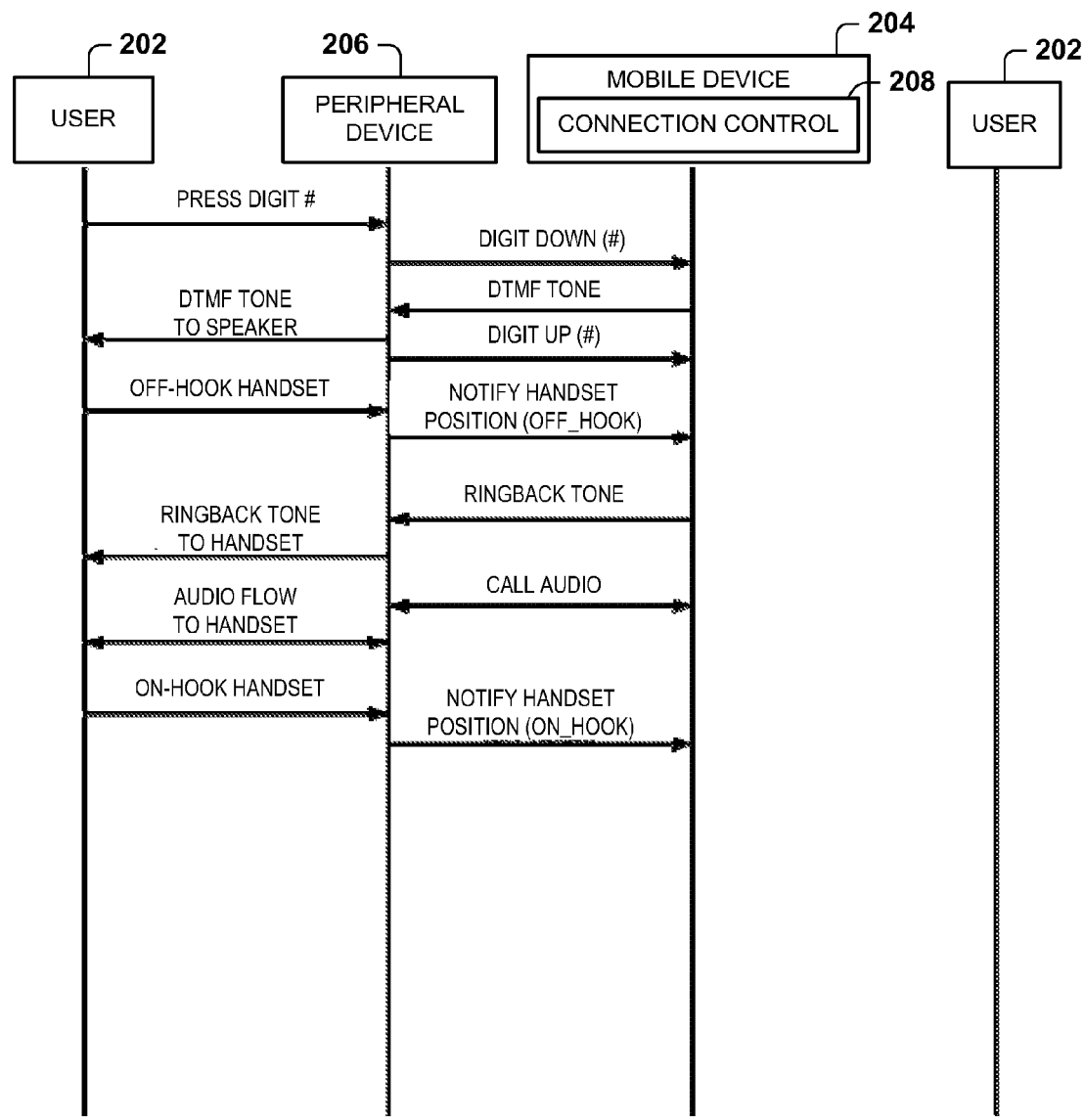
FIG. 8 is a signaling diagram demonstrating an example of placing an outgoing call through the mobile device via user inputs at a peripheral device.

FIG. 8 depicts an example of an outgoing VOIP call that can be implemented via the peripheral device 206 in a hands free mode using the keypad of the peripheral device. In the example of FIG. 8, in response to a user pressing down on a digit on the keypad, the peripheral device 206 can send a digit down signal for the identified digit via an established signaling channel to the connection control of the mobile device. The mobile device 204 can return a corresponding DTMF tone to the peripheral device 206 via the signaling channel that has been established over one of the connections between the peripheral device and the mobile device. The resulting DTMF tone can be flowed to the speaker of the peripheral device and rendered as audible sound to the user. Similarly, a "digit up" signal can be provided via the signaling channel from the peripheral device 206 to the connection control 208 of the mobile device 204 in response to a user releasing the digit of the keypad, which can result in the mobile device terminating the DTMF tone provided to the peripheral device 206. Additionally, the user can pick up the handset after completing the dialing of a desired telephone number. In response, the peripheral device 206 can provide a notification message of the handset position via the signaling channel between the peripheral device and the mobile device 204. The connection control 208 can provide a corresponding ring back tone to the peripheral device via the signaling channel, which can employ render an audible ring back tone to the handset that is off-hook. Once a call has been connected, media data corresponding to the call audio can be communicated over the media channel that has been selected for communication of call audio between the mobile device 204 and the peripheral device 206. In this example, the corresponding audio would in turn flow to the handset that is currently off hook. Once the handset has been placed back on hook (or the call is otherwise terminated at the peripheral device), the peripheral device 206 can provide a corresponding notification to the connection control 208 of the mobile device indicating that the position is on hook and the connection control can utilize this information to terminate the call via the currently utilized access technology at the mobile device.

Figure 9:
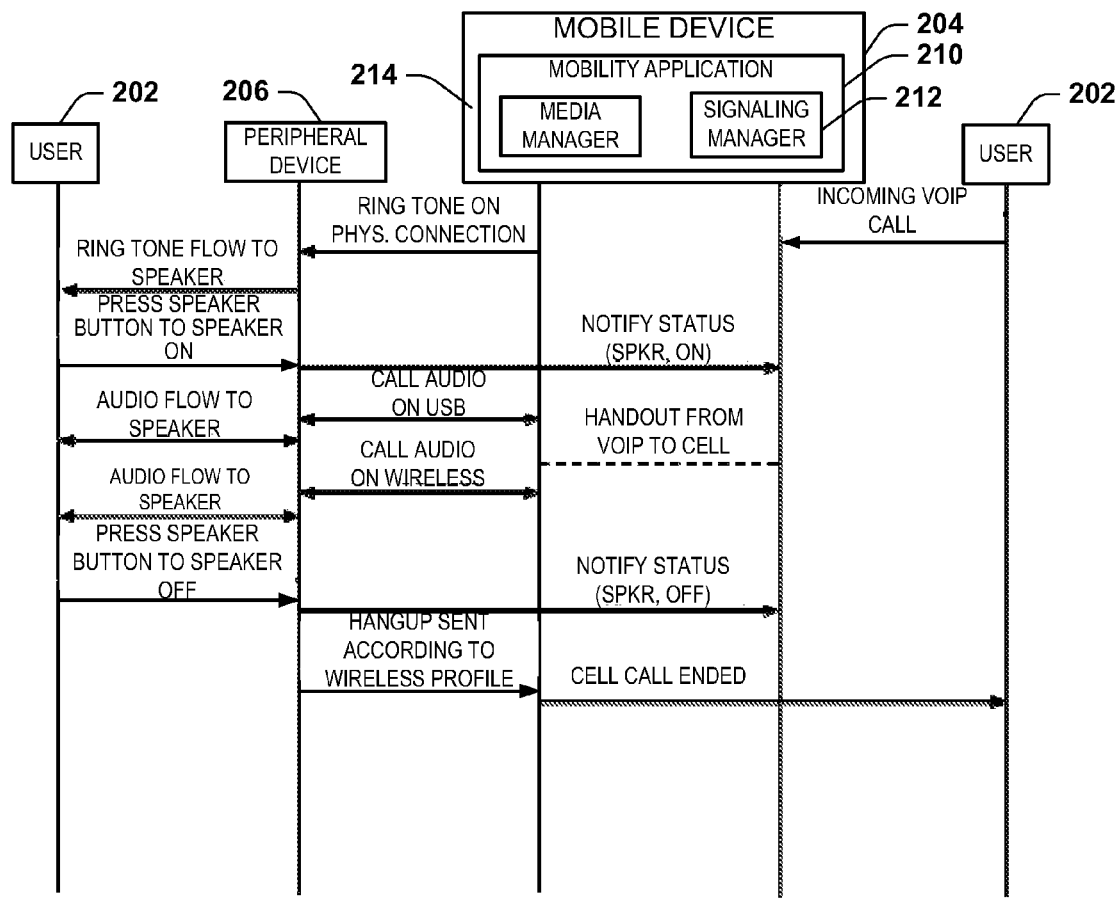
FIG. 9 is a signaling diagram depicting an example of signaling that can occur during a handover from a VOIP call to a cellular call.

FIG. 9 depicts an example of a handover situation in which a VOIP call is handed over to a cellular access technology. In the example of FIG. 9, it is presumed that at least a physical connection and a wireless connection exist between the mobile device 204 and the peripheral device 206. In the example of FIG. 9, to facilitate signaling flow, the system demonstrates a mobility application 210 of the mobile device as including both a signaling manager 212 and a media manager 214, which can form part of the connection control of the mobility application, such as disclosed herein. An incoming VOIP call is received by the mobility application (e.g., call control thereof) 210, such as via a session initiation protocol (SIP) invite message. In response to the incoming VOIP call, a ringtone is supplied to the peripheral device on a media channel over the established physical connection (e.g., USB or other). The peripheral device 206 can flow the corresponding ringtone to the speaker according to execution of control logic of the peripheral. In response, a user can press the speaker button (or pick up a handset), which activates the speaker and associated LED to the ON condition at the peripheral device. The peripheral device 206 in turn sends a notification via the signaling channel of the mobile device that the speaker is in the ON condition. In response to the notification, the media manager 214 can provide the call audio (e.g., media data) for the VOIP call on the media channel over the physical connection between the peripheral device and the mobile device. The peripheral device 206 can flow the audio to the speaker of the peripheral device, thereby providing communication between the user and the peripheral device in a hands free manner over the speaker phone.

At some point in the example of FIG. 9, a handout from VOIP access technology to a cellular access technology occurs (e.g., by handover logic of the mobility application 210). In response to the handover to cellular, the media manager 214 in turn can change the connection for the media channel from the physical connection to a short range wireless connection, such as Bluetooth. The peripheral device 206, in response to the change in the media channel, can provide the audio to the speaker with minimum interruption to the user. At some point when the call has finished, the user can press the speaker button to turn the speaker and its associated LED to the OFF condition, and the peripheral device provides a notification that the speaker has been turned to the off condition via the signaling channel over the selected connection (e.g., the physical connection). Since the call audio was over the short range wireless protocol, the wireless protocol can further provide a hang up request from the peripheral device to the mobile device to end the cellular telephone call session.

Figure 10:
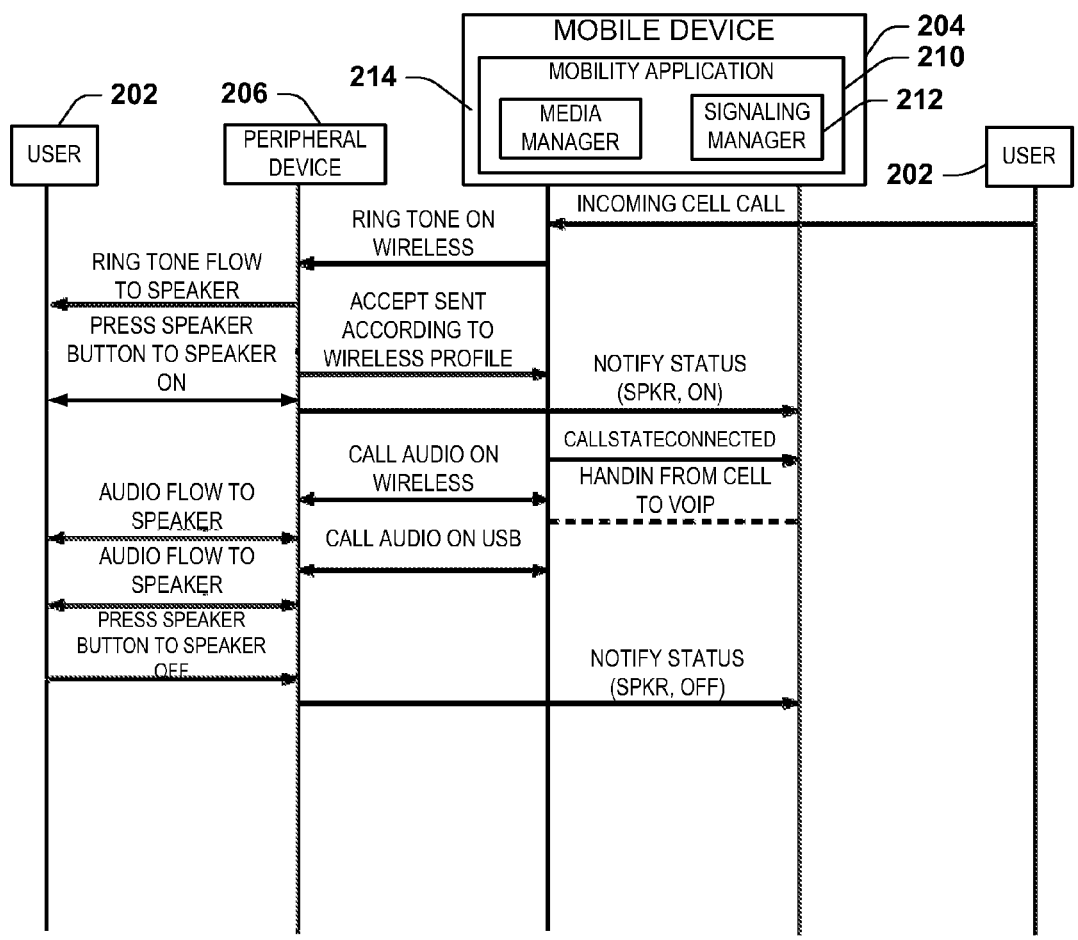
FIG. 10 is a signaling diagram demonstrating an example of signaling that can occur during a handover of a cellular call being to a VOIP call.

FIG. 10 illustrates an example in which a media session over a cellular access technology is handed over to a VOIP access technology. In the example of FIG. 9, it is presumed that at least a physical connection and a wireless connection exist between the mobile device 204 and the peripheral device 206. An incoming cellular call is received at the mobile device 204 and, in response, the operating system of the mobile device automatically can employ a protocol (e.g., Bluetooth) to provide a ringtone to the peripheral device over the authenticated wireless connection. The peripheral device 206 can flow the corresponding ringtone to the speaker to alert the user of the incoming call. A user can press the speaker button of the peripheral device to answer the call. The peripheral device 206 can in turn send an answer command via the wireless protocol, as is known in the art. The peripheral device 206 can also send a notification that the speaker has been activated to the ON condition via the current signaling channel between the peripheral device and the mobile device. The information regarding the connected call can be communicated from the operating system to the mobility application. In response to the cellular call being established the media manager 214 can enable the media channel to be communicated via the wireless connection (e.g., using Bluetooth). The peripheral device can flow the media to the speaker via the routing function implemented by the peripheral control.

At some point in this example, the cellular call is transferred to a VOIP access technology (e.g., by handover logic of the mobility application 210). In response to detecting the call being transferred to VOIP, the media manager 214 can transfer the media data to a physical connection (e.g., USB). The peripheral device 206 can in turn flow the media data (audio) received via the physical connection to the speaker. When it is desired to end the call, the user can press the speaker button to turn the LED off. The peripheral device 206 can in turn employ the signaling channel over the selected connection (e.g., the physical connection) to provide a notification that the speaker has been turned to the off condition and the mobility application 210 can terminate the call.

What have been described above are examples. It is, of course, not possible to describe every conceivable combination of components or methodologies, but one of ordinary skill in the art will recognize that many further combinations and permutations are possible. Accordingly, the disclosure is intended to embrace all such alterations, modifications, and variations that fall within the scope of this application, including the appended claims. As used herein, the term "includes" means includes but not limited to, the term "including" means including but not limited to. The term "based on" means based at least in part on. Additionally, where the disclosure or claims recite "a," "an," "a first," or "another" element, or the equivalent thereof, it should be interpreted to include one or more than one such element, neither requiring nor excluding two or more such elements.

What is claimed is:

1. A non-transitory computer-readable medium that includes instructions executable by a processor, the instructions comprising:
   connection logic to provide connection data identifying which of at least two connections is available for communication between a mobile device and a peripheral device when the mobile device is docked with the peripheral device;
   a signaling manager to control a signaling channel for communication of signaling data over a first connection of the at least two connections between the mobile device and the peripheral device, the first connection being selected from the at least two connections based on the connection data;
   a media manager to control a media channel for communication of media data over a second connection of the at least two connections between the mobile device and the peripheral device based on the connection data, the first connection and the second connection being selected independently; and
   a call control programmed to provide instructions to control at least one of a first media interface and a second media interface for communicating the media data via different respective access technologies between the mobile device and a network;
   wherein the call control is further programmed to mitigate handover from a voice over internet protocol (VoIP) access technology to a cellular voice access technology in response to the connection data indicating that the mobile device is docked with the peripheral device, whereby the VOIP access technology is prioritized relative to the cellular voice access technology while the mobile device is docked with the peripheral device.

2. The medium of claim 1, wherein the at least two connections comprises a wireless connection and a physical connection, the wireless connection comprises a short range radio frequency communications technology and the physical connection comprises a multi-pin physical connection.

3. The medium of claim 2, wherein the connection logic is further programmed to prevent using the wireless connection for the media channel between the mobile device and the peripheral device unless at least one of the physical connections is established or the wireless connection is enabled in response to a user input.

4. The medium of claim 1, further comprising a call control programmed to provide instructions to control at least one of a first media interface and a second media interface for communicating the media data via different respective access technologies between the mobile device and the network.

5. The medium of claim 4, wherein the call control is further programmed to control handover between first and second of the different respective access technologies and to provide media interface data indicating which of the first and second of the different respective access technologies is being used for communicating the media data between the mobile device and the network,
   the connection logic being further programmed to control which of the at least two connections between the peripheral device and the mobile device is used for the media channel based on the media interface data.

6. The medium of claim 5, wherein the media manager is programmed to communicate the media channel over a physical connection based on the connection data indicating that the mobile device is physically docked with the peripheral device and in response to the media interface data indicating a handover from the cellular voice access technology to a voice over internet protocol (VoIP) access technology.

7. The medium of claim 5, wherein the media manager is programmed to communicate the media channel to the peripheral device via a wireless connection based on the connection data indicating that the mobile device is docked with the peripheral device and in response to the media interface data indicating a handover from the voice over internet protocol access technology to the cellular access technology.

8. The medium of claim 7, wherein the media manager is further programmed to switch the media channel from the wireless connection to a handset of the mobile device in response to losing the wireless connection.

9. The medium of claim 1, wherein the connection logic is further programmed to disable one of the at least two connections until another of the at least two connections has been established between the mobile device and the peripheral device.

10. The medium of claim 1, wherein the connection logic is further programmed to disable one of the at least two connections until an activation message is received from the peripheral device via a message in the signaling channel provided via another of the at least two connections in response to a user input.

11. The medium of claim 1, further comprising an update component to send an update message via the signaling channel to update program instructions for operating the peripheral device.

12. The medium of claim 1, wherein each of the first connection and the second connection is authenticated to enable communication of both the signaling channel and the media channel between the mobile device and the peripheral device.

13. The medium of claim 12, wherein the peripheral device is a docking station and the mobile device is a multi-function mobile telecommunications device.

14. The medium of claim 1, wherein the signaling data and media data are routed between the mobile device and the peripheral device on the same connection.

15. A non-transitory computer-readable medium that includes instructions executable by a processor, the instructions comprising:
  connection logic to provide connection data identifying which of at least two connections is available for communication between a mobile device and a peripheral device when the mobile device is docked with the peripheral device;
  a signaling manager to control a signaling channel for communication of signaling data over a first connection of the at least two connections between the mobile device and the peripheral device, the first connection being selected from the at least two connections based on the connection data;
  a media manager to control a media channel for communication of media data over a second connection of the at least two connections between the mobile device and the peripheral device based on the connection data, the first connection and the second connection being selected independently; and
  a data extractor to receive a user input message from the peripheral device via the signaling channel, the user input message encoding data entered at the peripheral device via a user input device.

16. The medium of claim 15, further comprising a call control programmed to control a first media interface for communicating the media data via a voice over internet protocol access technology and a second media interface for communicating the media data via another access technology, each of the first and second media interfaces being resident in the mobile device,
  wherein the call control is responsive to the data encoded in the user input message to control the first media interface for communicating the media data via the voice over internet protocol access technology between the mobile device and the network.

17. A non-transitory computer-readable medium to store instructions for performing a method that comprises:
  detecting a mobile device being docked with a docking station using at least one physical connection and at least one wireless connection to provide communication between the mobile device and the docking station;
  selecting one of the physical or wireless connections for providing a signaling channel for communication of signaling data between the mobile device and the docking station;
  independently of the signaling channel, selecting one of the physical or wireless connections for providing a media channel for communication of media data between the mobile device and the docking station; and
  mitigating handover from a voice over internet protocol (VoIP) access technology to a cellular voice access technology in response to connection data indicating that the mobile device is docked with the docking station, whereby the VOIP access technology is prioritized relative to the cellular voice access technology while the mobile device is docked with the peripheral device.

18. The medium of claim 17, wherein the method further comprises preventing use of each wireless connection for the media channel between the mobile device and the docking station unless at least one of a physical connection is already established or the wireless connection is enabled in response to a user input.

19. The medium of claim 17, wherein the method further comprises:
  controlling which of at least two different respective wireless access technologies is employed for communication of the media data between the mobile device and a network;
  generating media interface data indicating which of the at least two different respective wireless access technologies is being used for communicating the media data between the mobile device and the network,
  controlling which of the physical or wireless connections between the docking station and the mobile device is used for the media channel based on the media interface data.

20. The medium of claim 19, wherein the media channel is communicated over the physical connection based on connection data indicating that the mobile device is docked with the docking station and the media interface data indicating that a voice over internet protocol access technology is employed for communication of the media data between the mobile device and the network.

21. The medium of claim 19, wherein the media channel is communicated over the wireless connection between the mobile device and the docking station based on connection data indicating that the mobile device is docked with the docking station and in response to the media interface data indicating a handover from a voice over internet protocol (VoIP) access technology to a cellular voice access technology.

22. The medium of claim 17, wherein the method further comprises:
  receiving a user input message from the docking station via the signaling channel, the user input message encoding data entered at the docking station via a user input device; and
  in response to receiving the data encoded in the user input message, controlling a first media interface for communicating the media data between the mobile device and a network via a voice over internet protocol (VOIP) access technology.

23. The medium of claim 17, wherein the method further comprises disabling one of the physical or wireless connections until another of the physical or wireless connections has been established for authenticated communication between the mobile device and the docking station.

24. The medium of claim 23, wherein the disabled connection is a selected wireless connection, the method further comprising overriding the disabling to enable the selected wireless connection in response to a user input received via the physical connection between the mobile device and the docking station.

25. A system, comprising:
  a mobile device comprising
    at least one wireless interface configured to communicate with a peripheral device using a wireless communications protocol;
    at least one physical interface configured to communicate with the peripheral device using a physical communications protocol; and
    connection control configured to select which of the wireless and physical interfaces to utilize for communicating signaling data over a signaling channel between the mobile device and the peripheral device and for communicating media data over a media channel for between the mobile device and the peripheral device in order to establish and maintain a state of connection between the mobile device and the peripheral device for each of the signaling channel and the media channel;
    a call control programmed to provide instructions to control at least one of a first media interface and a second media interface for communicating the media data via different respective access technologies between the mobile device and a network; and
  a peripheral device comprising a connection controller configured to control a plurality of connections to communicate the signaling data and the media data with the mobile device over each respective connection that is selected by the connection control,
  wherein the call control is further programmed to mitigate handover from a voice over internet protocol (VoIP) access technology to a cellular voice access technology in response to the connection data indicating that the mobile device is docked with the peripheral device, whereby the VOIP access technology is prioritized relative to the cellular voice access technology while the mobile device is docked with the peripheral device.

* * * * *